(12) United States Patent
Rogin et al.

(10) Patent No.: US 11,326,721 B2
(45) Date of Patent: May 10, 2022

(54) APPARATUS FOR SUPPORTING A FLEXIBLE CONDUIT HAVING A RELEASABLE CONNECTOR

(71) Applicant: The Metraflex Company, Chicago, IL (US)

(72) Inventors: Martin I. Rogin, Libertyville, IL (US); James D. Clauss, Frankfort, IL (US); Michael Albert Taylor, Chicago, IL (US); Daniel T. Holbach, Palatine, IL (US); Daniel R. Kish, Chicago, IL (US); James Reynold Richter, Chicago, IL (US)

(73) Assignee: The Metraflex Company, Chicago, IL (US)

( * ) Notice: Subject to any disclaimer, the term of this patent is extended or adjusted under 35 U.S.C. 154(b) by 65 days.

(21) Appl. No.: 16/862,195

(22) Filed: Apr. 29, 2020

(65) Prior Publication Data

US 2021/0341082 A1    Nov. 4, 2021

(51) Int. Cl.
*F16L 3/205*   (2006.01)
*F16L 3/133*   (2006.01)

(52) U.S. Cl.
CPC ............ *F16L 3/2053* (2013.01); *F16L 3/133* (2013.01)

(58) Field of Classification Search
CPC ................. F16L 3/2053; F16L 3/133
See application file for complete search history.

(56) References Cited

U.S. PATENT DOCUMENTS

| | | | |
|---|---|---|---|
| 933,625 A | 9/1909 | Clarkson | |
| 1,618,851 A | 2/1927 | Thunberg et al. | |
| 1,924,353 A | 8/1933 | Fitzpatrick | |
| 2,038,466 A | 4/1936 | Yates | |
| 2,158,802 A | 5/1939 | Redlon | |
| 2,511,335 A | 6/1950 | Guamaschelli | |
| 2,748,236 A | 5/1956 | Landis et al. | |
| 3,148,870 A * | 9/1964 | Suozzo | F16L 3/2053 267/178 |
| 3,199,553 A | 8/1965 | Garrett et al. | |

(Continued)

FOREIGN PATENT DOCUMENTS

| | | |
|---|---|---|
| CN | 112161113 A | 1/2021 |
| EP | 2416042 A2 | 2/2012 |

OTHER PUBLICATIONS

Patent Cooperation Treaty, PCT International Search Report from International Application PCT/US2015/051689, dated Dec. 29, 2015.

(Continued)

*Primary Examiner* — Anita M King
(74) *Attorney, Agent, or Firm* — Greer, Burns & Crain, Ltd.

(57) ABSTRACT

An apparatus having a flexible conduit which includes a flexible member and a rigid member in fluid communication with the flexible member, and a releasable connector. The releasable connector has a first member and a second member. When a releasing force is applied to the flexible conduit, the releasable connector separates. The apparatus also includes a shock absorber to configured to absorb a load when the releasable connector separates. The shock absorber may include elastomeric pads between rigid plates, a rotary dampener, a spring, rod and piston, or an elastic strap.

12 Claims, 8 Drawing Sheets

(56) References Cited

U.S. PATENT DOCUMENTS

| | | | |
|---|---|---|---|
| 3,370,815 A | 2/1968 | Opperthauser | |
| 3,493,206 A | 2/1970 | Albro | |
| 3,659,329 A | 5/1972 | Walker | |
| 3,694,011 A | 9/1972 | Silverman | |
| 3,985,213 A | 10/1976 | Braggins | |
| 4,105,177 A | 8/1978 | Smith et al. | |
| 4,185,477 A | 1/1980 | van der Lely et al. | |
| 4,306,696 A | 12/1981 | Pondman | |
| 4,344,729 A | 8/1982 | Orsinger et al. | |
| 4,406,148 A | 9/1983 | Knight | |
| 4,485,998 A * | 12/1984 | Kowalski | F16L 3/2053 248/561 |
| 4,524,934 A | 6/1985 | Rumble | |
| 4,524,935 A | 6/1985 | Rumble | |
| 4,681,294 A * | 7/1987 | Soltysiak | F16L 3/2053 248/613 |
| 4,687,365 A | 8/1987 | Promersberger | |
| 4,932,626 A | 6/1990 | Guillot | |
| 4,989,903 A | 2/1991 | McAllister | |
| 5,167,437 A | 12/1992 | Merten et al. | |
| 5,195,784 A | 3/1993 | Richter | |
| 5,303,885 A | 4/1994 | Wade | |
| 5,459,476 A | 10/1995 | Hsieh | |
| 5,484,219 A | 1/1996 | Drew et al. | |
| 5,697,480 A | 12/1997 | Herbermann et al. | |
| 5,803,506 A | 9/1998 | Argersinger et al. | |
| 5,836,361 A | 11/1998 | Koncsek | |
| 6,322,276 B1 | 11/2001 | Liu | |
| 6,554,524 B1 | 4/2003 | Smith | |
| 6,887,022 B2 | 5/2005 | Choate | |
| 7,249,704 B1 | 7/2007 | Smith | |
| 7,284,728 B2 | 10/2007 | Connolly | |
| 7,748,091 B2 | 7/2010 | Bogh-Sorensen | |
| 8,181,305 B2 | 5/2012 | Boos | |
| 8,210,580 B2 | 7/2012 | Engel et al. | |
| 9,856,997 B2 * | 1/2018 | Richter | F16L 3/133 |
| 2004/0018042 A1 | 1/2004 | Smith | |
| 2005/0081458 A1 | 4/2005 | McDonald | |
| 2008/0053549 A1 | 3/2008 | Friedline et al. | |
| 2009/0194992 A1 | 8/2009 | Bochenek et al. | |
| 2009/0224533 A1 | 9/2009 | Richter | |
| 2012/0310371 A1 | 12/2012 | Bachus et al. | |
| 2013/0192944 A1 | 8/2013 | Zimmerman et al. | |
| 2016/0091120 A1 | 3/2016 | Richter et al. | |
| 2016/0252197 A1 | 9/2016 | Roth | |
| 2017/0089493 A1 | 3/2017 | Richter et al. | |

OTHER PUBLICATIONS

Patent Cooperation Treaty, PCT Written Opinion of the International Searching Authority from International Application PCT/US2015/051689, dated Dec. 29, 2015.

Patent Cooperation Treaty, International Preliminary Report on Patentability from PCT/US2015/051689, dated Mar. 28, 2017.

Patent Cooperation Treaty, PCT International Search Report from corresponding International Application PCT/US2021/022944, dated Jun. 23, 2021.

Patent Cooperation Treaty, PCT Written Opinion of the International Searching Authority from corresponding International Application PCT/US2021/022944, dated Jun. 23, 2021.

* cited by examiner

APPARATUS FOR SUPPORTING A FLEXIBLE CONDUIT HAVING A RELEASABLE CONNECTOR

FIELD OF THE INVENTION

The present disclosure relates to an apparatus, and more particularly to an apparatus for supporting a flexible conduit having a releasable connector.

BACKGROUND

In the construction of buildings and other structures, it is known to use conduits that include a flexible portion to accommodate movement of the conduit. The movement can be intentional, for example, based upon thermal changes, or misalignment in a piping system, or unintentional, such as from a natural disaster, like an earthquake. Additionally, the flexible portion can dampen vibration of the conduits and reduce the transmission of noise through the conduit. An exemplary conduit with a flexible portion is disclosed, for example, in U.S. Pat. No. 5,195,784.

In order to safely support the flexible portion, the conduit may be connected to an anchor or anchoring means. For example, U.S. Pat. No. 5,195,784 discloses using one or more rods to support the flexible portion of the conduit by securing one end of the rod to the flexible portion and by anchoring the other end of the rod into a ceiling or other structural support member.

While presumably effective for its intended purpose, the anchoring rods are relatively rigid. Accordingly, if forces acting on the flexible conduit are not strong enough to break or bend the rod, the flexible conduit could break instead. This could be dangerous with portions of the conduit falling, and depending on the fluids in the conduit, could be deadly. Additionally, based upon the length of the flexible members of the flexible conduit, an undesirable and unappealing sagging of the flexible portions may occur.

In order to provide a support that addresses one or more of these drawbacks, a releasable connector and a tether may be used. For example, the support system in U.S. Pat. No. 9,631,743 contains a releasable connector associated with the support that is configured to disengage when a certain force is applied to the flexible conduit. Additionally, a tether, between the two portions of the releasable connector, may support the flexible conduit when the releasable connector has been separated. While this support system provides an improvement over existing designs, it has been found that such a system may not be fully effective for conduits that are very large or that are very heavy.

Thus, there is an ongoing need for efficient and effective supports configurations for conduits with flexible portions that address one or more of these drawbacks.

SUMMARY

A new apparatus for supporting a flexible conduit having a releasable connector has been invented. In the invented apparatus, a shock absorber may be used to dampen the impact force experienced by the flexible conduit if the primary support disengaged. In addition to addressing the drawbacks noted above for large an heavy conduits, the present invention may also provide multiple supports to effectively distribute the weight of the flexible conduit and the weight of the liquid therein among multiple supports to minimize or reduce the undesirable sagging.

Thus, according to a first aspect of the present disclosure, the present invention may generally be characterized as providing an apparatus having: a flexible conduit with a flexible member and a rigid member in fluid communication with the flexible member; and, a releasable connector. The releasable connector includes a female member and a male member. One of the female member and the male member is secured to one of the flexible conduit and a structural support member, and the other of the female member and the male member is secured to the other of the flexible conduit and the structural support member. Additionally, one of the male member and the female member includes a detent and the other of the male member and the female member includes a biased member configured to engage the detent, such that the biased member secures the male member in the female member until the releasable connector encounters a force sufficient to overcome a biasing force exerted by a biasing element on the biased member, and the releasable connector separates. The apparatus further includes a tether configured to support the flexible conduit when the releasable connector separates, wherein the tether is connected between the flexible conduit and a structural support member. The apparatus further includes a shock absorber configured to absorb a load transferred to the structural support member when the releasable connector separates.

The shock absorber may include: a rigid plate connected to the releasable connector with a securing means; a first mounting bracket secured to the structural support member; and a first elastomeric pad between the rigid plate and the first mounting bracket. The first elastomeric pad is attached to the first mounting bracket and the rigid plate. A second mounting bracket may be utilized. The first mounting bracket and the second mounting bracket are disposed on opposing sides of the rigid plate. A second elastomeric pad may be disposed between the second mounting bracket and the rigid plate. The second elastomeric pad may be attached to the second mounting bracket and the rigid plate. The rigid plate may be made of a metal. The first elastomeric pad may be made of rubber. The tether may be connected to both of the members of the releasable connector.

The shock absorber may include a rotary dampener, with a first end of the tether secured to the flexible conduit, and a second end of the tether secured to the rotary dampener. The rotary dampener may be a rotary dashpot. The rotary dashpot may include a spool such that the tether is wound around the spool of the rotary dashpot.

The shock absorber may include a spring secured to the structural support member.

The shock absorber may include a closed cylinder and a piston rod extending out of the closed cylinder.

The shock absorber may include an elastic strap.

According to a second aspect of the present disclosure, the present invention may be broadly characterized as providing an apparatus with: a flexible conduit having a flexible member and a rigid member in fluid communication with the flexible member; and a releasable connector having a first member and a second member. The first member may be secured to the flexible conduit, and the second member may be secured to a structural support member. When a releasing force is applied to the apparatus, the releasable connector separates. The apparatus also includes a tether having a first end and a second end. The tether may be configured to support the flexible conduit when the members of the releasable connector separate. The first end may be connected to the first member and the second end may be connected to the second member. The tether is arranged such that it is not under tension when the members of the releasable connector are connected. The apparatus further includes a shock absorber secured to the structural support member and the second member and configured to absorb a load when the releasable connector separates and the tether is under tension. The shock absorber includes: a rigid plate attached to the one of the members of the releasable connector by a securing means; a first mounting bracket secured to the structural support member; and a first elastomeric pad between the rigid plate and the mounting bracket. The first elastomeric pad is attached to the first mounting bracket and the rigid plate.

The shock absorber may include a second mounting bracket. The first mounting bracket and the second mounting bracket may be disposed on opposing sides of the rigid plate. The shock absorber may include a second elastomeric pad between the second mounting bracket and the rigid plate. The second elastomeric pad may be attached to the second mounting bracket and the rigid plate.

The rigid plate may be made of a metal.

The first elastomeric pad may be made of rubber.

According to a third aspect of the present disclosure, the present invention may be characterized generally as providing an apparatus having a flexible conduit with a flexible member and a rigid member in fluid communication with the flexible member. The apparatus also includes: a releasable connector formed from complementary configured members configured to separate when a releasing force is applied to the flexible conduit; a rotary dampener assembly; and a tether having a first end secured to the flexible conduit, and a second end secured to the rotary dampener assembly.

The rotary dampener assembly may include a rotary dashpot.

The rotary dampener assembly may also include a spool such that the tether is wound around the spool.

A second tether may be attached to the complementary configured members of the releasable connector, such that when the releasable connector separates, the second tether supports the flexible conduit.

Additional aspects, embodiments, and details of the invention, all of which may be combinable in any manner, are set forth in the following detailed description of the invention.

BRIEF DESCRIPTION OF THE DRAWINGS

The attached figures will make it possible to understand how the present disclosure can be produced. In these figures, similar reference numbers denote similar elements.

DETAILED DESCRIPTION OF THE PREFERRED EMBODIMENTS

A support for a flexible conduit having a releasable connector is disclosed. The flexible conduit is supported, but, when the flexible conduit is subjected to certain forces, the releasable connector disengages so as to avoid the flexible conduit breaking or to allow maximum movement. Additionally, the releasable connector may be adjusted so that the amount of force needed to disengage the releasable connector from the support is variable based upon particular applications. The apparatus may include a secondary support to support the flexible conduit if a primary support has been disengaged. Finally, the apparatus includes a shock absorber attached to either the primary support or the secondary support to allow for forces from the portions of the conduit moving due the releasable connector disengaging.

Accordingly, with reference the attached drawings, one or more embodiments of the present disclosure will now be described with the understanding that the described embodiments are merely preferred and are not intended to be limiting.

Figure 1:
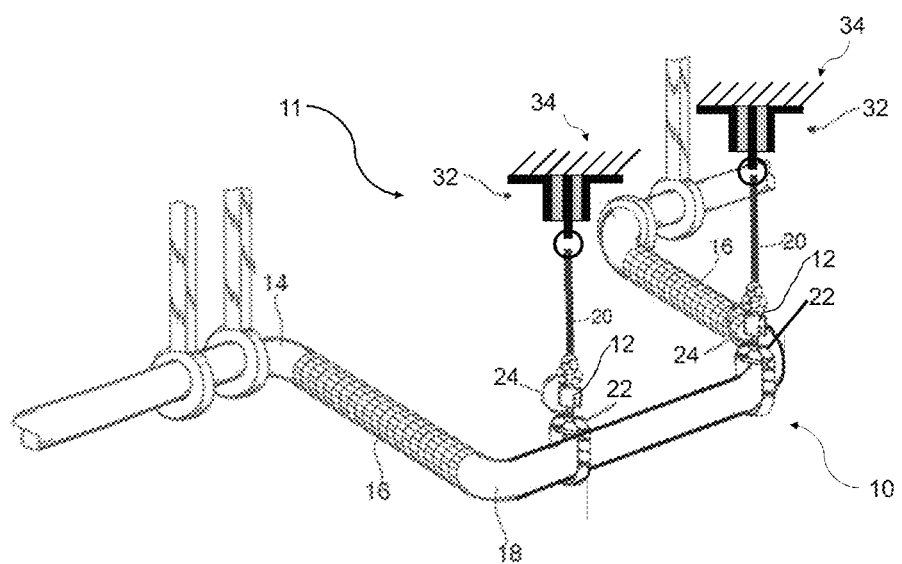
FIG. 1 is a top and side perspective view of an embodiment of an apparatus for supporting a flexible conduit according one or more embodiments to the present invention.

Starting with FIG. 1, an apparatus 10 according to the present disclosure is utilized in association with a flexible conduit 11. As depicted, it is contemplated to use two or more support apparatuses 10 for a flexible conduit 11.

The flexible conduit 11 includes at least one flexible member 16 and at least one rigid member 18. Various configurations of the flexible conduit 11 are contemplated. For example, the flexible conduit 11 optionally includes, for example, two rigid elbow members 14, two flexible tube members 16, and a rigid U-shaped member 18 disposed between the two flexible tube members 16. Other configurations may be used so long as the flexible conduit 11 includes at least one rigid member 14, 18 and at least one flexible member 16. The stiffness of the members 16 and 18 is typically in relation to each other, with the rigid members 18 typically formed from metal, plastic, or the like, and the flexible members 16 typically formed from mesh covered conduits such as metal braided hose or another similar material. These materials are merely exemplary.

The apparatus 10 for supporting the flexible conduit 11 generally includes a releasable connector 12 between a rod 20 anchoring the flexible conduit 11 to a support element like a wall or ceiling and a clevis 22 surrounding one of the members of the flexible conduit 11. The rod 20 and the clevis 22 are merely exemplary and other devices, structures, or elements may be used. In addition, the releasable connector 12 optionally includes a support tether 24 that is typically not under tension when the members of the releasable connector 12 are connected. If the flexible conduit 11 is subjected to a force sufficient to cause the releasable connector 12 to separate, the support tether 24 will be subjected to a tension and will support the flexible conduit 11.

Various releasable connectors 12 are contemplated, including, but not limited to, any multipart assembly that is formed by a complementarily configured members which release when a predetermined force is applied to either member. Different means are suited to achieve the releasable connection, including, but not limited to springs, snap fit connections, and breakable joints.

Figure 2:
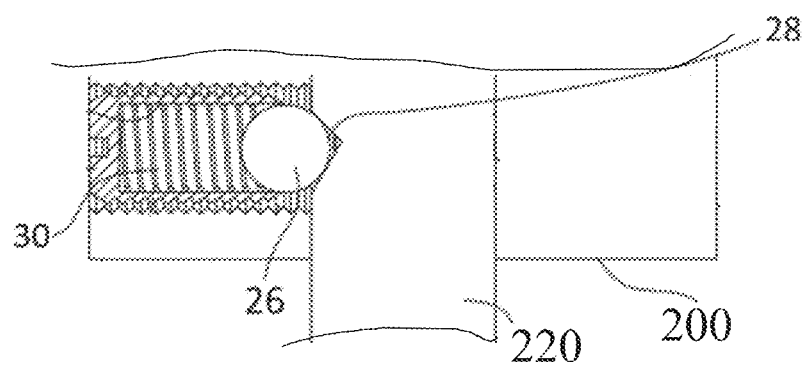
FIG. 2 is a side cutaway view of a portion of the releasable connector of FIG. 1.

A portion of a preferred releasable connector 12 is shown in FIG. 2 in which the releasable connector 12 includes a female member 200 and a male member 220. In the depicted embodiment, the female member 200 includes a biased member 26, which engages with the detent 28 in the male member 220. A biasing element 30 provides a biasing force to the biased member 26. When the flexible conduit 11 is subjected to a force sufficient to overcome the biasing force applied to the biased member 26, the members 200, 220 of the releasable connector 12 will separate.

The biasing element 30 may be any component which provides a biasing force, such as, but not limited to, a spring. Additionally, the biasing force provided by the biasing element 30 may be adjusted so that the releasable connector 12 will be separated by the desired amount of force being applied to the flexible conduit 11.

It is contemplated that instead of the depicted arrangement, the male member 220 includes the biased member 26, and the female member 200 includes the detent 28. Additionally, it is further contemplated that additional detents 28 and biased elements 26 are included in the releasable connector 12.

Figure 4:
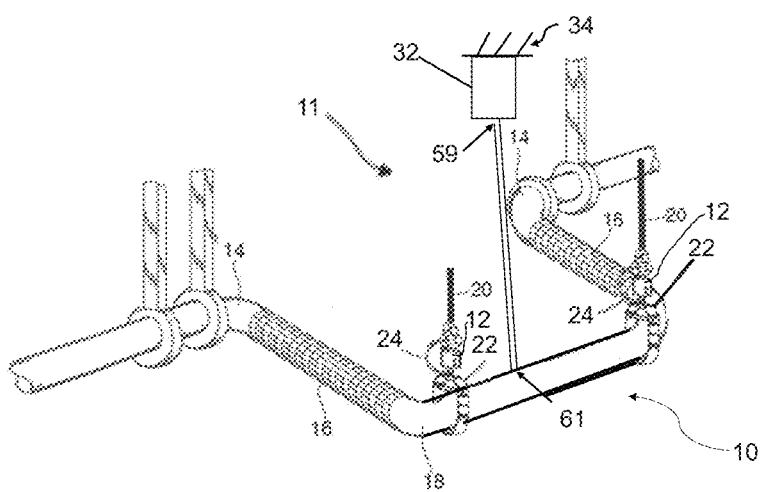
FIG. 4 is a top and side perspective view of another embodiment of an apparatus for supporting a flexible conduit according one or more embodiments to the present invention.

Referring to FIGS. 1 and 4, in order to take up the forces that are applied when the releasable connector 12 separates, the apparatus 10 also includes at least one shock absorber 32. The shock absorber 32 is secured to a structural support member 34, like a beam or the ceiling. The shock absorber 32 is also secured to the flexible conduit 11.

In FIG. 1, the shock absorber 32 is attached, by a securing means 36, to the rod 20. The securing means 36 may be any structures that allow for the shock absorber 32 to be attached to the rod 20. Thus, the securing means 36 may be, for example, eyebolts, clips, clasps, threaded rods, screws, fasteners, and the like.

Figures 3A, 3B:
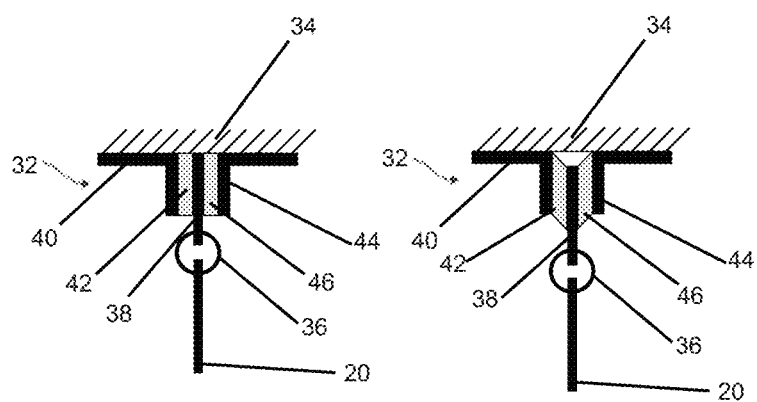
FIG. 3A is a side plan view of the shock absorber from FIG. 1 in a loaded state.
FIG. 3B is a side plan view of the shock absorber of FIG. 1 in an unloaded state.

Referring to FIGS. 3A and 3B, in this depicted embodiment the shock absorber 32 includes a rigid plate 38, which is secured to the rod 20 by the securing means 36. Additionally, the shock absorber 32 includes a first mounting bracket 40 which may be utilized to secure the shock absorber 32 to the structural support member 34. Various means are contemplated for securing the first mounting bracket 40 to the structural support member 34, including, but not limited to, adhesive, fasteners (not shown).

In the shock absorber 32 depicted in FIGS. 3A and 3B, a first elastomeric pad 42 is attached to both the rigid plate 38 and the first mounting bracket 40. The first elastomeric pad 42 is less rigid than the first mounting bracket 40 and the rigid plate 38. Various materials are suitable for the first mounting bracket 40 and the rigid plate 38, including, but not limited to, metal and plastic. Additionally, the first elastomeric pad 42 is preferably made of rubber or other suitable material that can be temporarily deformed. These materials are merely exemplary.

The shock absorber 32 of FIGS. 3A and 3B preferably includes a second mounting bracket 44, such that the second mounting bracket 44 and the first mounting bracket 40 are disposed on opposing sides of the rigid plate 38. Additionally, a second elastomeric pad 46 may be located between and attached to the second mounting bracket 44 and the rigid plate 38.

FIG. 3A depicts the shock absorber 32 before the flexible conduit 11 is subjected to a force that causes the releasable connector 12 to separate. Therefore, the shock absorber 32, as depicted in FIG. 3A, is not experiencing any loading beyond the static loading caused by the weight of the flexible conduit 11, any liquids therein, and the apparatus 10 components.

However, FIG. 3B illustrates the shock absorber 32 after the flexible conduit 11 has experienced a force sufficient to cause the male and female members 200, 220 of the releasable connectors 12 to separate. Therefore, the shock absorber 32, through the tether support 24 is loaded by the weight of the flexible conduit 11, any liquids therein, as the flexible conduit 11 is pulled down by gravity. Accordingly, the shock absorber 32 dampens the impact experienced by the flexible conduit 11 falling.

More specifically, when the releasable connector 2 has separated, the flexible conduit 11 is pulled downward by gravity since it is no longer completely supported. Eventually, the support tether 24 will be tensioned and then the downward pull will be transferred to the shock absorbers 32. The elastomeric pads 42, 46 of the shock absorbers 32 will deform as the rigid plate 38 is pulled toward the flexible conduit 11. Thus, the elastomeric pads 42, 46 experience sheer stresses, caused by the rigid plate 38 being drawn toward the flexible conduit 11. However, the elastomeric pads 42, 46 are designed to withstand the sheer stresses, allowing the rigid plate 38 to be pulled toward the flexible conduit 11, without fracturing. This deformation can slow the rapid acceleration caused by the releasable connector 12 separating which might otherwise damage the flexible conduit 11 or the support structure 34.

Turning to FIG. 4, instead of being secured to the releasable connector 12, it is contemplated that the shock absorber 32 is secured to one of the members 14, 16, 18 of the flexible conduit 11. For example, a dampener tether 58 can be secured at one end 59 to the shock absorber 32 and a second end 61 to the members 14, 16, 18 of the flexible conduit 11. Various structures or means may be used to secure the dampener tether 58 to the members 14, 16, 18 of the flexible conduit 11, including for example a clevis or a bracket.

Figure 5:
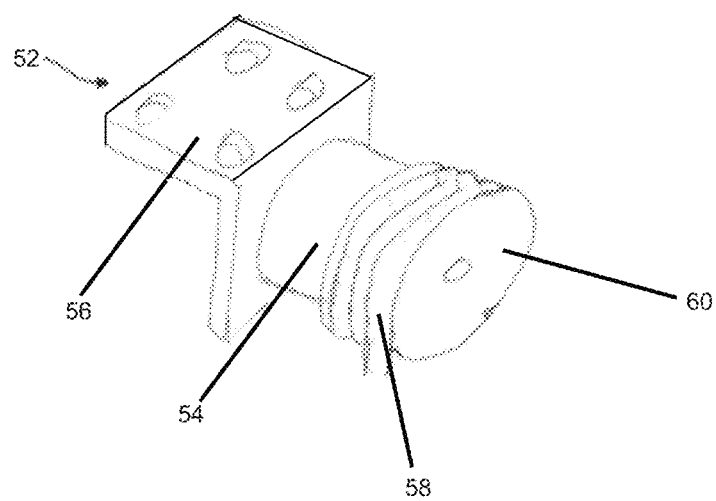
FIG. 5 is a top and side perspective view of a shock absorber used in one or more embodiments of the present invention.

With reference to FIG. 5, it is further contemplated that the shock absorber includes a rotary dampener assembly 52 to slow the downward acceleration of the flexible conduit 11 when the releasable connectors 12 have separated.

The rotary dampener assembly 52 includes a rotary dampener 54, a mounting bracket 56. The rotary dampener 54 may be a rotary dashpot. The bracket 56 rotatably supports the rotary dampener 54 and is secured to the support structure 34 (see FIG. 3). The rotary dampener 54 may include a spool 60, such that the dampener tether 58 is wound around the spool 60. The rotary dampener 54 is biased to pull up on the dampener tether 58 and wind it around the spool 60. Accordingly, there is tension in the dampener tether 58 under normal conditions.

In use, when the releasable connector 12 is separated, again the the flexible conduit 11 is pulled downward by gravity. The force of the downward pull is greater than the biasing of the rotary dampener 54. Accordingly, more of the dampener tether 58 will be unwound from the spool 60. However, this will occur slowly, as the rotary dampener assembly 52 is biased in the opposite direction. The slower descent is believed to minimize any damage that might be caused by the falling flexible conduit 11.

Figure 6:
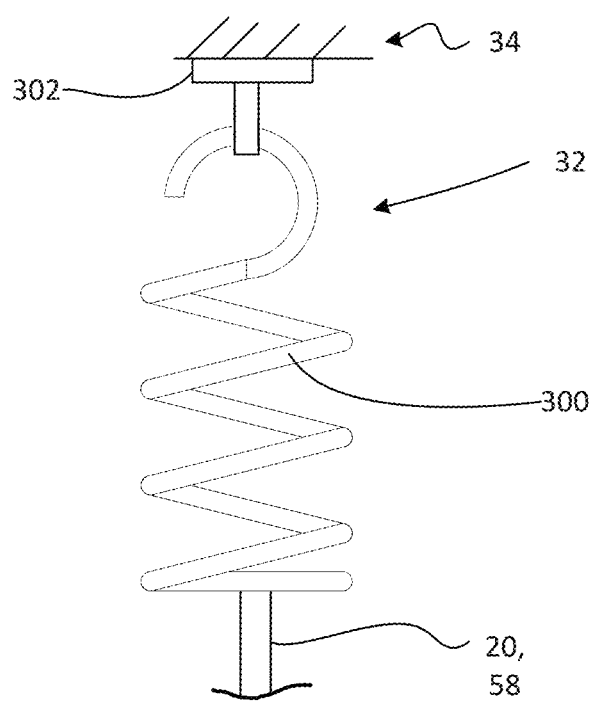
FIG. 6 is a top and side perspective view of another shock absorber used in one or more embodiments of the present invention.

Turning to FIG. 6, in some embodiments, a spring 300 may be used as the shock absorber 32. The spring 300 may be used in the configuration of FIG. 4, in which the tether 58 is secured to the flexible conduit 11 and the spring 300. The spring 300 may also be attached to the structural support element 34 with, for example, a bracket 302 or other conventional structures. Alternatively, the spring 300 may be disposed between the structural support element 34 and the releasable connector 12 (as shown in FIG. 1).

In either configuration, when the members of the releasable connector 12 have become detached, the flexible conduit 11 will be pulled downward. The spring 300 will absorb the downward pull based on forces transferred from the tether 58 or the tether 24.

Figure 7:
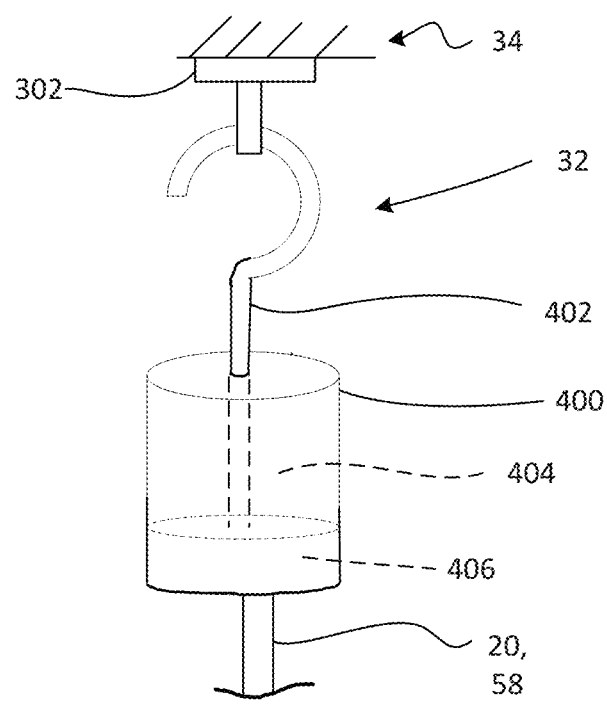
FIG. 7 is a top and side perspective, partial see-through view of another shock absorber used in one or more embodiments of the present invention.

Additionally, as shown in FIG. 7, it is further contemplated that the shock absorber 32 includes a closed cylinder 400 and a piston rod 402 extending out of the closed cylinder 400. Inside of the closed cylinder 400, as is known, is a fluid 404, either a hydraulic fluid such as an oil, or, a gas, like compressed air. An end of the piston rod 402, inside of the closed cylinder 400, may include a disk 406 Again, the closed cylinder 400 and the piston rod 402 may be secured to the tether 58 connected to the flexible conduit 11 and to the structural support element 34 with, again for example, the bracket 302 or other conventional structures. See, FIG. 4. Alternatively, the cylinder 400 and the piston 402 may be disposed between the structural support element 34 and the releasable connector 12 (as shown in FIG. 1).

In either configuration, when the members of the releasable connector 12 have become detached, the flexible conduit 11 will be pulled downward. In the depicted configuration, the closed cylinder 400 will be pulled down from the tether 58 or the tether 24 and away from the piston rod 402. The fluid 404 in the closed cylinder 400 will be compressed by the disk 406 and the top of the closed cylinder 400 to absorb forces created by the sudden downward pull of the flexible conduit 11.

Figure 8:
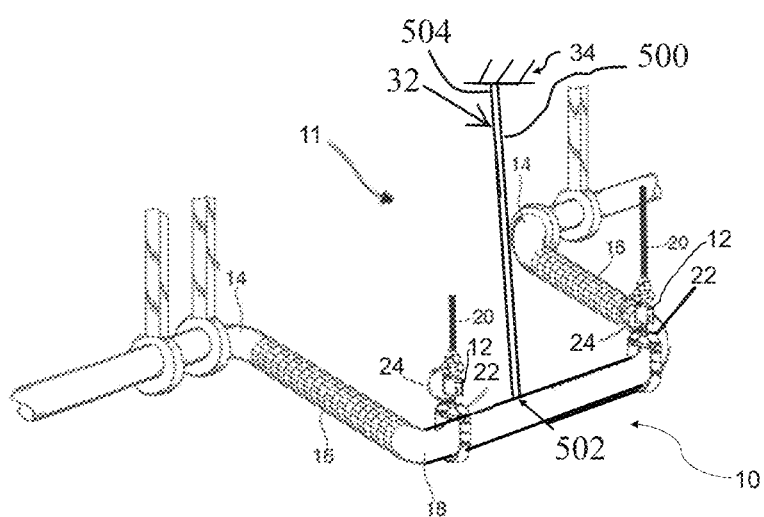
FIG. 8 is a top and side perspective view of an embodiment of an apparatus for supporting a flexible conduit according one or more embodiments to the present invention.

Turning to FIG. 8, in another embodiment of the present invention, the shock absorber 32 is an elastic strap or elastic tether 500. As will be appreciated, elastic strap 500 is formed from a material that is able to be deformed by a force and the returns to its original (or close to its original) form, size, and shape after the force is removed.

As depicted in FIG. 8, the elastic strap 500 has a first end 502 secured to the flexible conduit 11. A bracket (see, e.g. FIG. 7) may be used. A second end 504 of the elastic strap 500 is secured to the structural support element 34. Various structures or means may be used to secure the second end 504 of the elastic strap 500 to the flexible conduit 11, including for example a clevis or a bracket. Alternatively, the elastic strap 500 may be disposed between the structural support element 34 and the releasable connector 12 (as shown in FIG. 1). In such a case, the rod 20 may be replaced with the elastic strap 500. In either configuration, when the releasable connector 12 separates, the elastic strap 500 will absorb some of the weight of the flexible conduit 11 as it falls.

Accordingly, in sum, with a shock absorber 32, the present invention provides for suitable and sufficient support for larger flexible conduits 11 and minimizes damage when release connectors 12 separate. As depicted, it is contemplated to use two or more support apparatuses 10 for a flexible conduit 11.

As is apparent from the foregoing specification, the disclosure is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An apparatus comprising:
   a flexible conduit comprising:
      a flexible member; and
      a rigid member in fluid communication with the flexible member;
   a releasable connector, the releasable connector comprising:
      a female member; and
      a male member, wherein one of the female member and the male member is secured to one of the flexible conduit and a structural support member, and wherein the other of the female member and the male member is secured to the other of the flexible conduit and the structural support member, and
   wherein one of the male member and the female member includes a detent and the other of the male member and the female member including a biased member configured to engage the detent, such that the biased member secures the male member in the female member until the releasable connector encounters a force sufficient to overcome a biasing force exerted by a biasing element on the biased member, and the releasable connector separates;
   a tether configured to support the flexible conduit when the releasable connector separates, wherein the tether is connected between the flexible conduit and a structural support member; and
   a shock absorber configured to absorb a load transferred to the structural support member when the releasable connector separates.

2. The apparatus of claim 1, wherein the shock absorber comprises:
   a rigid plate connected to the releasable connector with a securing means;
   a first mounting bracket secured to the structural support member; and
   a first elastomeric pad between the rigid plate and the first mounting bracket, wherein the first elastomeric pad is attached to the first mounting bracket and the rigid plate.

3. The apparatus of claim 2, further comprising:
   a second mounting bracket, wherein the first mounting bracket and the second mounting bracket are disposed on opposing sides of the rigid plate; and,
   a second elastomeric pad between the second mounting bracket and the rigid plate, wherein the second elastomeric pad is attached to the second mounting bracket and the rigid plate.

4. The apparatus of claim 2, wherein the rigid plate is made of a metal.

5. The apparatus of claim 2, wherein the first elastomeric pad is made of rubber.

6. The apparatus of claim 2, wherein the tether is connected to both of the members of the releasable connector.

7. The apparatus of claim 1, wherein the shock absorber comprises:
   a rotary dampener, wherein a first end of the tether is secured to the flexible conduit, and a second end of the tether is secured to the rotary dampener.

8. The apparatus of claim 7, wherein the rotary dampener is a rotary dashpot.

9. The apparatus of claim 8, wherein the rotary dashpot has a spool such that the tether is wound around the spool of the rotary dashpot.

10. The apparatus of claim 1, wherein the shock absorber comprises:
   a spring secured to the structural support member.

11. The apparatus of claim 1, wherein the shock absorber comprises:
   a closed cylinder and a piston rod extending out of the closed cylinder.

12. The apparatus of claim 1, wherein the shock absorber comprises:
   an elastic strap.

* * * * *